(12) United States Patent
Noguchi (10) Patent No.: US 12,246,807 B2
(45) Date of Patent: Mar. 11, 2025

(54) SIMPLE SHELTER FOR FLOOD EVACUATION

(71) Applicant: NIHON TAISHIN SEKKEI CO., LTD., Tokyo (JP)

(72) Inventor: Akihiro Noguchi, Tokyo (JP)

(73) Assignee: NIHON TAISHIN SEKKEI CO., LTD., Tokyo (JP)

( * ) Notice: Subject to any disclaimer, the term of this patent is extended or adjusted under 35 U.S.C. 154(b) by 463 days.

(21) Appl. No.: 17/750,998

(22) Filed: May 23, 2022

(65) Prior Publication Data

US 2022/0380008 A1    Dec. 1, 2022

(30) Foreign Application Priority Data

May 25, 2021    (JP) .................................. 2021-087344

(51) Int. Cl.
*B63C 9/06*    (2006.01)
*E04H 9/14*    (2006.01)

(52) U.S. Cl.
CPC ............... *B63C 9/06* (2013.01); *E04H 9/145* (2013.01)

(58) Field of Classification Search
CPC .... B63C 9/00; B63C 9/02; B63C 9/06; B63C 9/065; B63B 7/082; B63B 19/14; E04H 9/14; E04H 9/145; Y02A 10/30

USPC .......................... 114/343, 346, 348, 349, 355
See application file for complete search history.

(56) References Cited

U.S. PATENT DOCUMENTS

2023/0107297 A1 *    4/2023    Yano ........................ B63C 9/06
441/80

FOREIGN PATENT DOCUMENTS

| JP | 5274699 B1 * | 8/2013 | ............. B63B 19/00 |
| JP | 2015-151060 | 8/2015 | |
| JP | 2017-171265 | 9/2017 | |
| JP | 2017-217990 | 12/2017 | |
| JP | 6937069 | 9/2021 | |

* cited by examiner

*Primary Examiner* — Daniel V Venne
(74) *Attorney, Agent, or Firm* — Greenblum & Bernstein, P.L.C.

(57) ABSTRACT

A simple shelter for flood evacuation that is lightweight and easy to carry, compact in storage, and low in cost includes a substantially cylindrical floating body formed by a plurality of floats stacked in a vertical direction, where vertically adjacent floats are connected to each other; and two partition plates provided on the inner peripheral side of the uppermost and lowermost floats, respectively, of the plurality of floats, the inner peripheral surface of the floating body and the two partition plates form a closed accommodation space for accommodating evacuees by preventing water from entering from the outside, and a door for evacuees to enter and exit the accommodation space is provided in the two partition plates.

4 Claims, 11 Drawing Sheets

SIMPLE SHELTER FOR FLOOD EVACUATION

CROSS-REFERENCE TO RELATED APPLICATIONS

This application is based upon and claims the benefit of priority from the Japanese Patent Application No. 2021-087344, filed May 25, 2021 the entire content of which is incorporated herein by reference.

TECHNICAL FIELD

The present invention relates to a simple shelter for flood evacuation used for emergency evacuation when flood disaster such as tsunami or flood occurs.

BACKGROUND ART

Japan is an earthquake-prone country, and it is expected that a massive earthquake will occur in the near future, so it is necessary to prepare for strike of a massive tsunami due to occurrence of a massive earthquake. In addition, it is necessary to prepare not only for earthquakes, but also for flooding of rivers, floods, and other floods in places where those disasters are likely to occur.

For example, Patent Literature 1 discloses a portable flood shelter which can be stored compactly in a normal state, and which instantaneously forms an evacuation living space having a substantially cylindrical wall composed of a gas bag which can absorb shocks when flood damages such as tsunamis occur, and waits for rescue while drifting.

PATENT LITERATURE

PTL 1: Japanese Laid-Open Application No. 2017-171265

SUMMARY OF INVENTION

Technical Problem

In the portable flood shelter of Patent Literature 1, heavy objects such as high-pressure cylinders and starting devices for instantaneously expanding the gas bag are stored in the storage portion provided at the bottom of the shelter, and the position of the center of gravity of the whole shelter is lowered, so that the shelter is constructed to be constantly positively restorable on the water surface. Therefore, the shelter of Patent Literature 1 has a structure in which entering and exiting from the living space is possible by opening and closing the lid portion provided at the upper portion of the shelter.

However, in the structure in which a storage portion is provided at the bottom of the shelter and heavy objects such as high-pressure cylinders or starting devices are housed therein, the weight becomes relatively heavy as a portable shelter, and by providing a high-pressure cylinder or a starting device, the cost of the shelter is also increased.

In addition, it is difficult to stably maintain the attitude of the shelter in a torrent of a tsunami or a flood or rubble shed by them, and it is well assumed that the shelter rolls over or is turned upside down. When the shelter is turned upside down, it is not possible to open the lid provided on the upper part of the shelter, and it is difficult to grasp the external condition from the shelter, to escape from the shelter, or to take in air into the shelter.

Furthermore, a safety belt is provided at the base of the shelter on the assumption that the attitude of the shelter is stably maintained, but if the evacuees are fixed inside the shelter with such a safety belt and the shelter is rolled over or turned upside down, the evacuees may fail to take appropriate action, and rather, the evacuees may fall into a dangerous state.

One of the objects of the present invention is to provide a simple shelter for flood evacuation capable of further enhancing the safety of evacuees even in the torrents of tsunamis or floods and rubble shed by them.

Another object of the present invention is to provide a simple shelter for flood evacuation, which is lighter in weight, more portable, compact at the time of storage, and lower in cost.

Solution to Problem

A simple shelter for flood evacuation comprises:
- a substantially cylindrical floating body formed by a plurality of floats each filled with a gas injected through a gas injection valve and having a hollow doughnut shape, the plurality of floats being stacked in a vertical direction and vertically adjacent floats of the plurality of floats being connected to each other; and
- two partition plates provided on the inner circumferential sides of uppermost and lowermost floats, respectively, of the plurality of floats;
- inner peripheral surfaces of the floating body and the two partition plates forming a closed accommodation space for accommodating evacuees by preventing water from entering from the outside, and
- the two partition plates each provided with a door for the evacuees to enter and exit the accommodation space.

By providing the door to both the partition plates provided respectively on the uppermost and lowermost float, the shelter is vertically reversed, and even if one of the partition plates is submerged, it is possible to grasp the external situation and escape from the shelter through the door provided on the other partition plate.

Preferably, the simple shelter comprises a safety belt consisting of two belts extending between the two partition plates and arranged in parallel and apart from each other, the safety belt configured to arrange a body of the evacuee between the inner peripheral surface of the floating body and the two belts to prevent the evacuee from falling.

According to this configuration, it is possible to prevent falling of the evacuee only by entering between the two belts and the inner peripheral surface of the floating body, and no other operation is required. The evacuees is not required to perform any release operation of the safety belt when escaping from the shelter.

More preferably, the two partition plates are provided with air holes for taking air from the outside into the accommodation space,
  and the simple shelter further comprises blocking plugs manually insertable into and removable from the air holes.

By inserting a blocking plug into each of the air holes provided in the two partition plates, entry of water is surely prevented, and when air intake becomes necessary, the blocking plug on the side not submerged can be manually pulled out from the air hole to easily intake the air.

More preferably, a configuration may be adopted in which the doors of the two partition plates are each provided with a window made of a transparent material through which visual recognition of an outside is possible.

By providing windows on the doors of the two partition plates, it is possible to grasp the external situation without opening the door, even if the shelter is upside down.

Advantageous Effects of Invention

According to the present invention, there is provided a simple shelter for flood evacuation capable of enhancing the safety of evacuees even in torrents of a tsunami or a flood or in rubble shed by them.

Further, according to the present invention, there is provided a simple shelter for flood evacuation that is lightweight, has excellent transportability, is compact during storage, and is low in cost.

BRIEF DESCRIPTION OF DRAWINGS

FIG. 7 (*a*) is a cross-sectional view showing a state in which an air hole formed in a door is closed with a blocking plug, and FIG. 7 (*b*) is a cross-sectional view showing a state in which the blocking plug is removed from the air hole.

DESCRIPTION OF EMBODIMENTS

Embodiments of the present invention will be described below with reference to the drawings.

FIGS. 1 to 4 show the basic structure of a simple shelter for flood evacuation (hereinafter referred to as a shelter) 1 according to an embodiment of the present invention.

As shown in FIGS. 1 to 4, the shelter 1 includes a floating body 10 having a substantially cylindrical shape composed of a plurality of (four) floats 10*a* to 10*d* stacked in the vertical direction, and partition plates 20, 20 provided on the inner peripheral side of the uppermost float 10*a* and the lowermost float 10*d*, respectively, and the inner peripheral surface of the floating body 10 and the two partition plates 20 and 20 form a closed accommodation space SP in which water is prevented from entering from the outside and an evacuee EH is accommodated.

Vertically adjacent floats of the plurality of floats 10*a* to 10*d* constituting the floating body 10 are connected to each other.

Partition plates 20, 20 are each formed in a disc shape, the outer peripheral edge portions are connected to the inner peripheral surfaces of the uppermost float 10*a* and the lowermost float 10*d*.

Each of the plurality of floats 10*a* to 10*d* is formed of, for example, a rubber material, and has a structure similar to that of a tire tube. The outer peripheral portions of the floats 10*a* to 10*d* are provided with respective gas injection valves 11, and when a gas such as air is injected and filled into the floats 10*a* to 10*d* through the gas injection valves 11, the floats 10*a* to 10*d* will each have a hollow doughnut-shaped form as shown in FIGS. 1 to 4.

The partition plates 20 each includes a substantially annular fixing portion 22 fixed to the inner peripheral surface of the float 10*a* or the float 10*d*, and a door 24 for opening and closing an entrance 22*a* formed in the fixing portion 22.

The fixing portion 22 and the door 24 are made of a resin such as polyester. The detailed structure of the partition plate 20 will be described later.

The door 24 is connected to the fixing portion 22 by a hinge 25, and the door 24 is adapted to be opened toward the outside. As will be described later, the door 24 is provided with a window 26 and an air hole 28 for taking air into the accommodation space SP.

Figure 1:
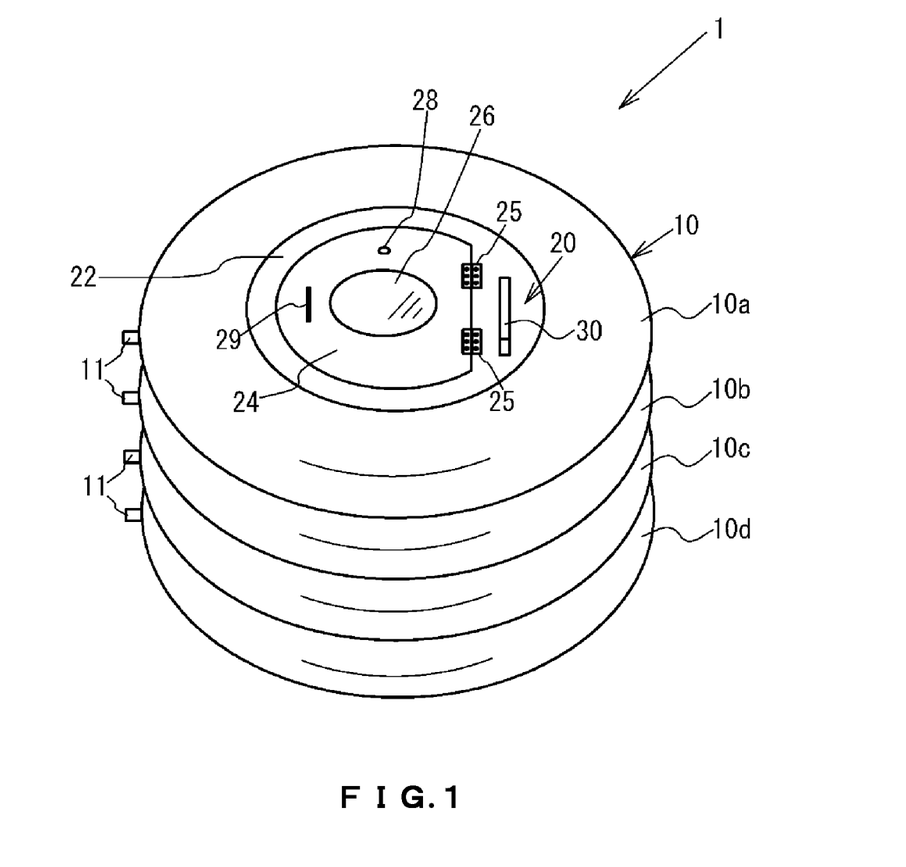
FIG. 1 is an external perspective view of a simple shelter for flood evacuation according to an embodiment of the present invention.
Figure 2:
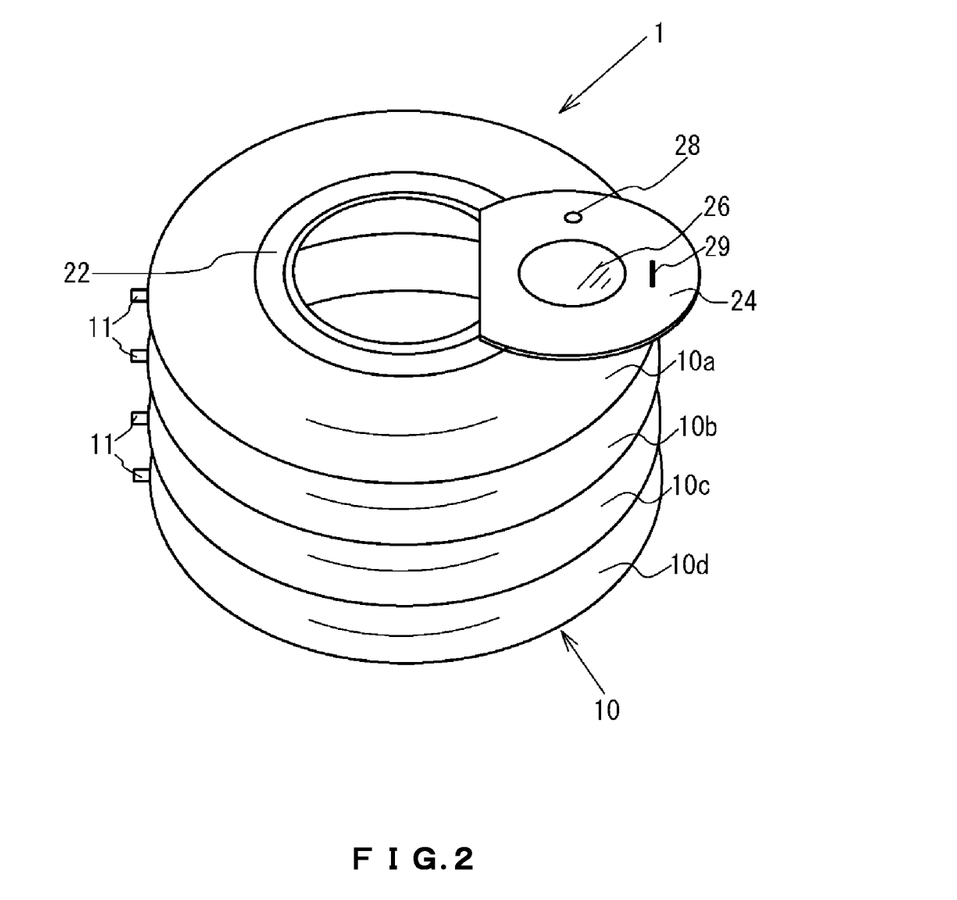
FIG. 2 is an external perspective view showing a state in which a door of the simple shelter for flood evacuation is opened in FIG. 1.
Figure 3:
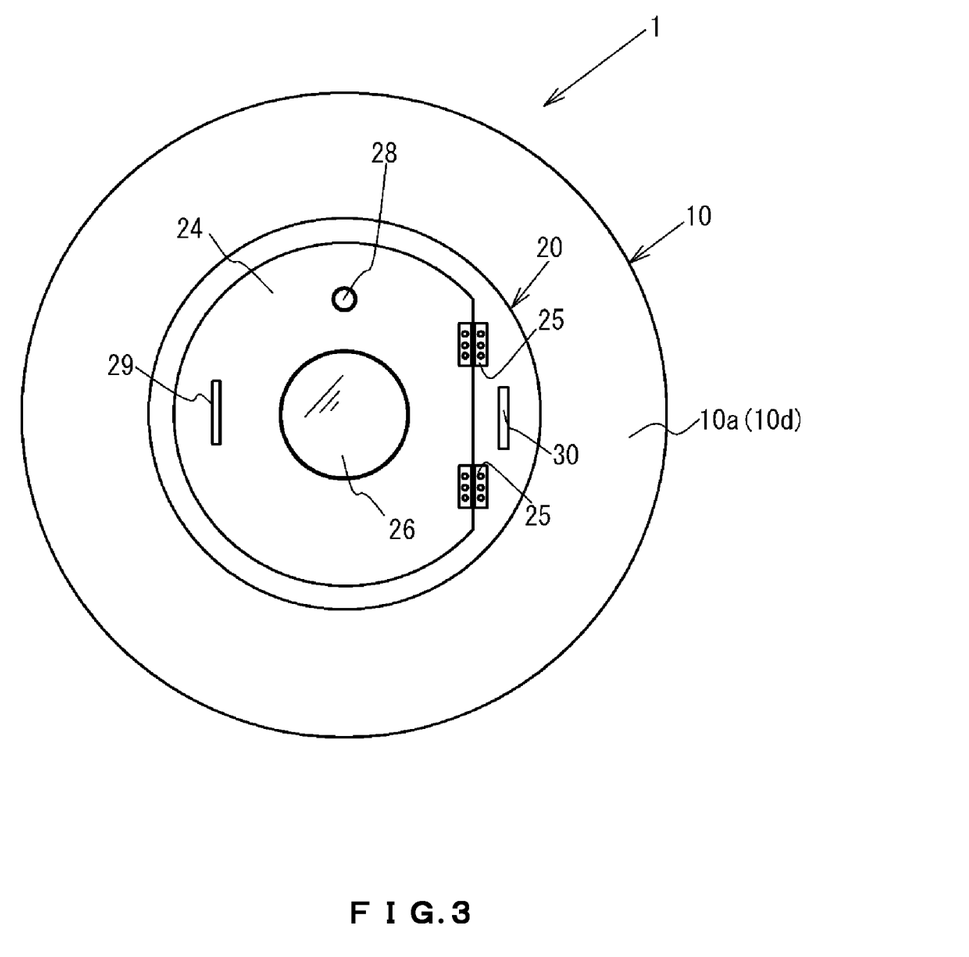
FIG. 3 is a top view of the simple shelter for flood evacuation in FIG. 1.
Figure 4:
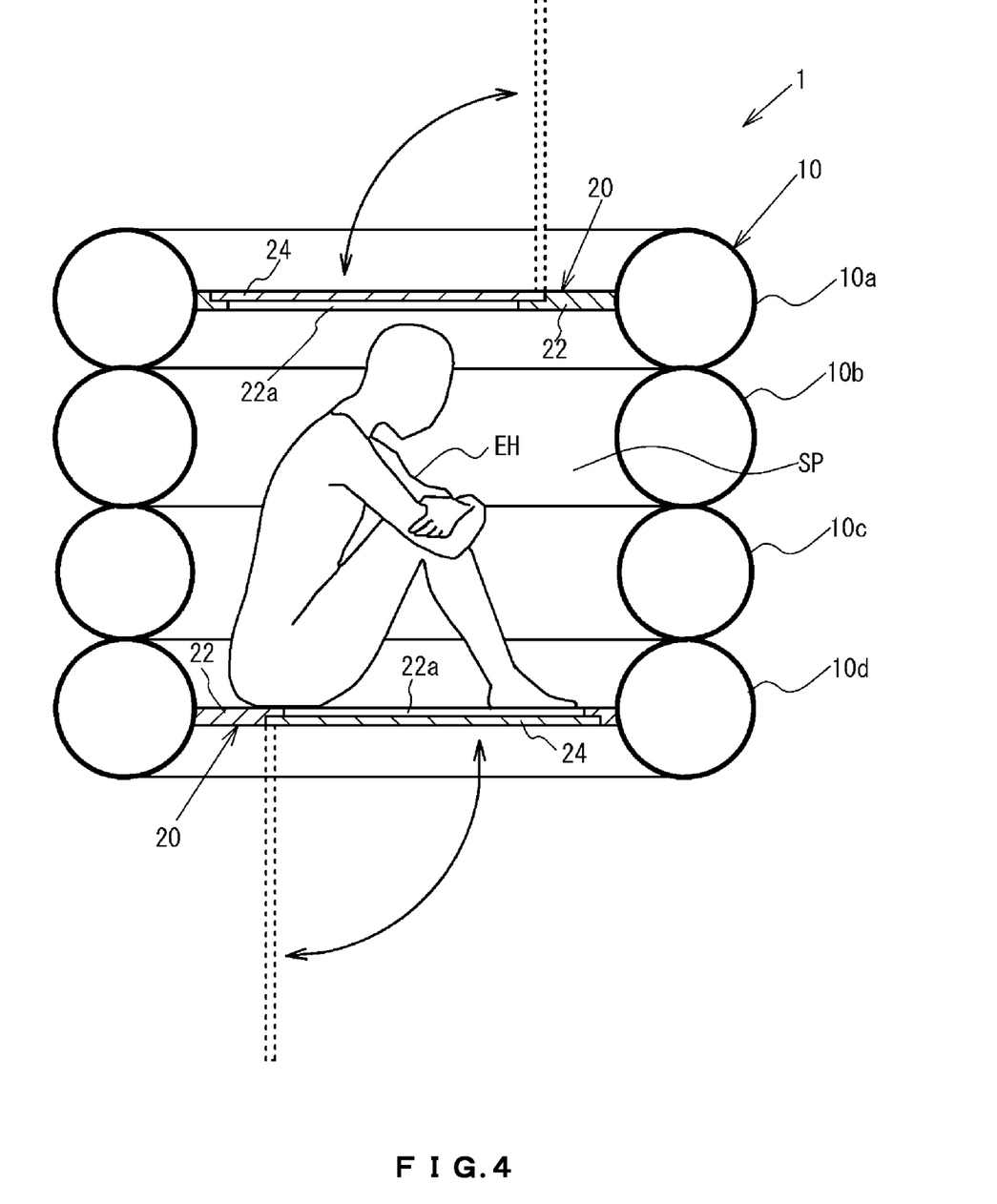
FIG. 4 is a longitudinal sectional view showing a schematic structure of the simple shelter for flood evacuation in FIG. 1.
Figure 5:
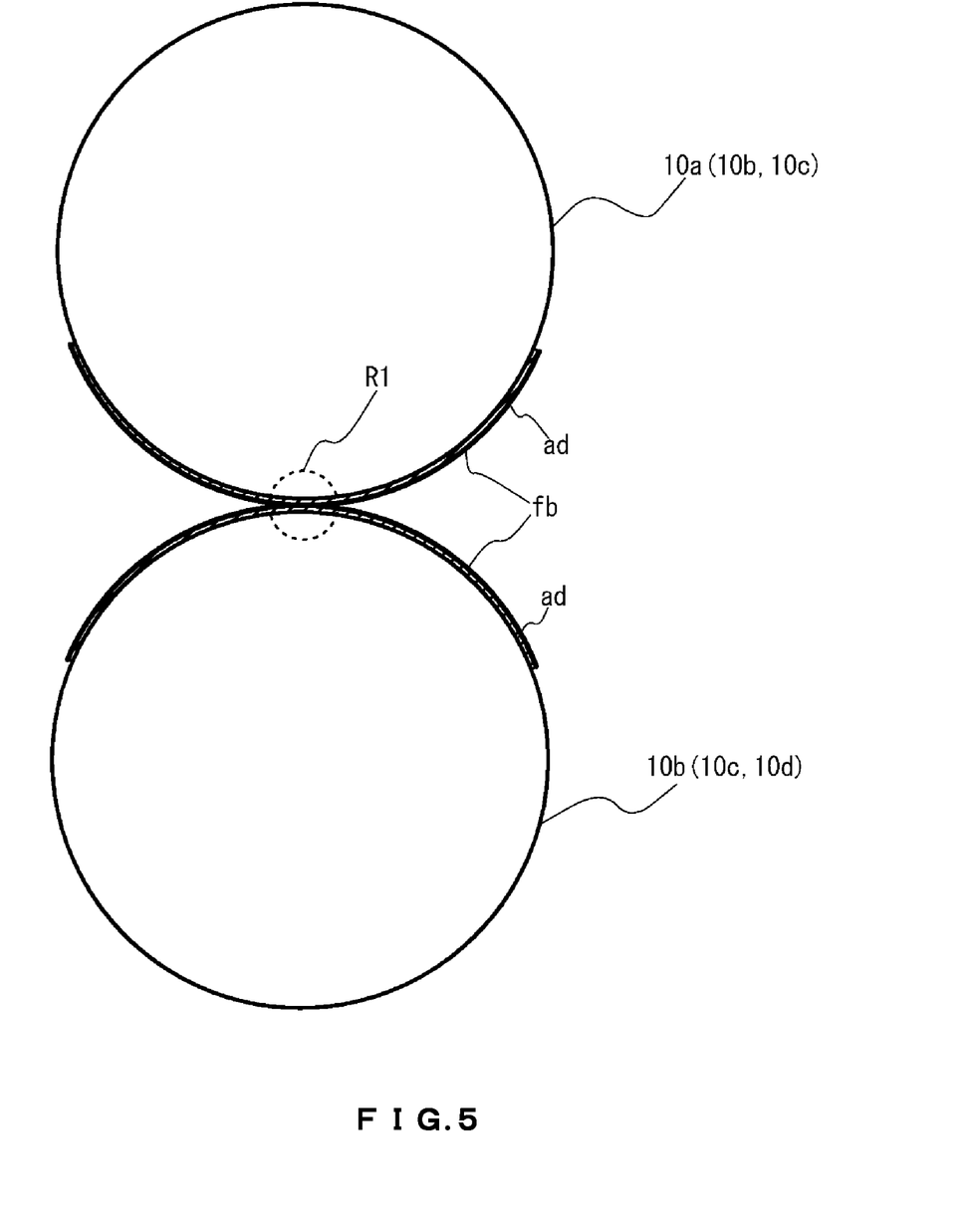
FIG. 5 is a diagram for explaining an example of a connecting method between floats.

FIG. 5 shows an example of a connection method of the floats 10*a* to 10*d*.

A cloth member fb is attached to a part of the outer peripheral surfaces in the circumferential direction of the floats 10*a* and 10*b* adjacent to each other in the vertical direction with an adhesive. The cloth member fb is made of a material such as chlorosulfonated polyethylene (CSM) or polyvinyl chloride (PVC), and a portion shown in the region R1 where the cloth members fb come into contact with each other are bonded by suturing. Thereby, the float 10*a* and the float 10*b* are connected to each other, and water does not enter from the portion where the float 10*a* and the float 10*b* are connected to each other. The other floats are connected in the same way.

The fixing portions 22 of the partition plates 20 and the floats 10*a* and 10*d* can also be connected by bonding using the cloth members fb.

Figure 6A:
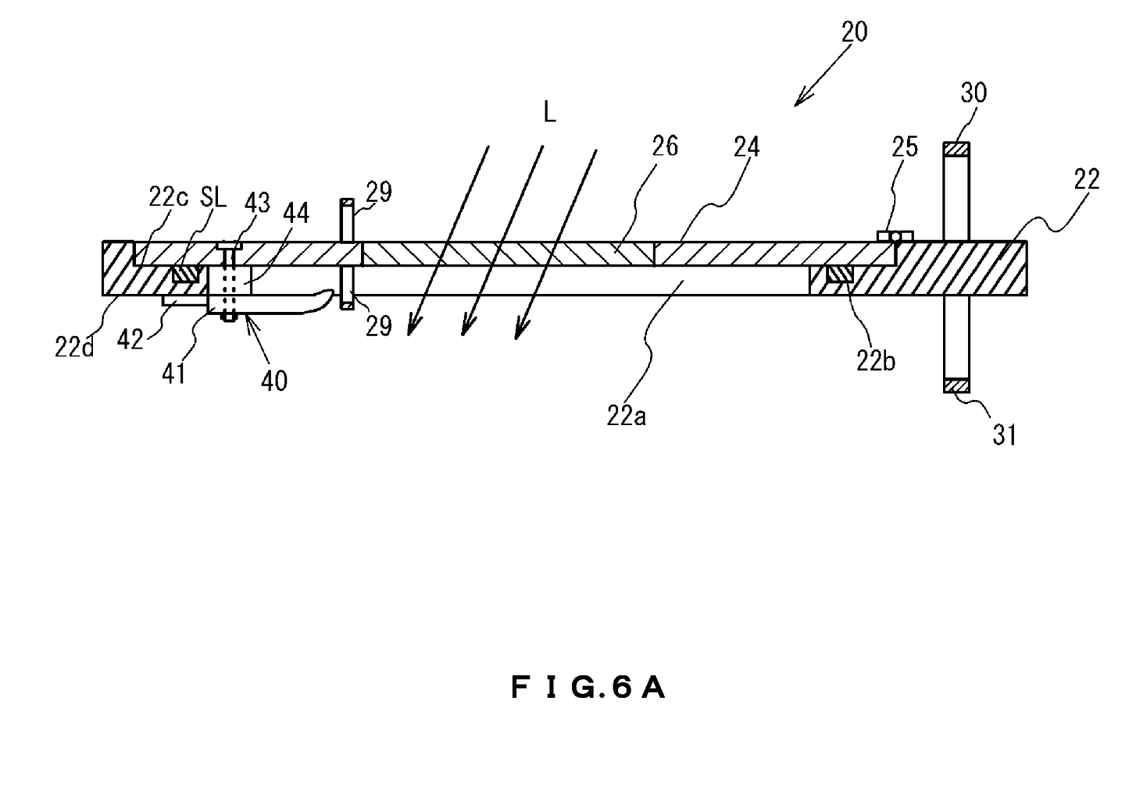
FIG. 6A is a cross-sectional view showing the structure of a partition plate.
Figure 6B:
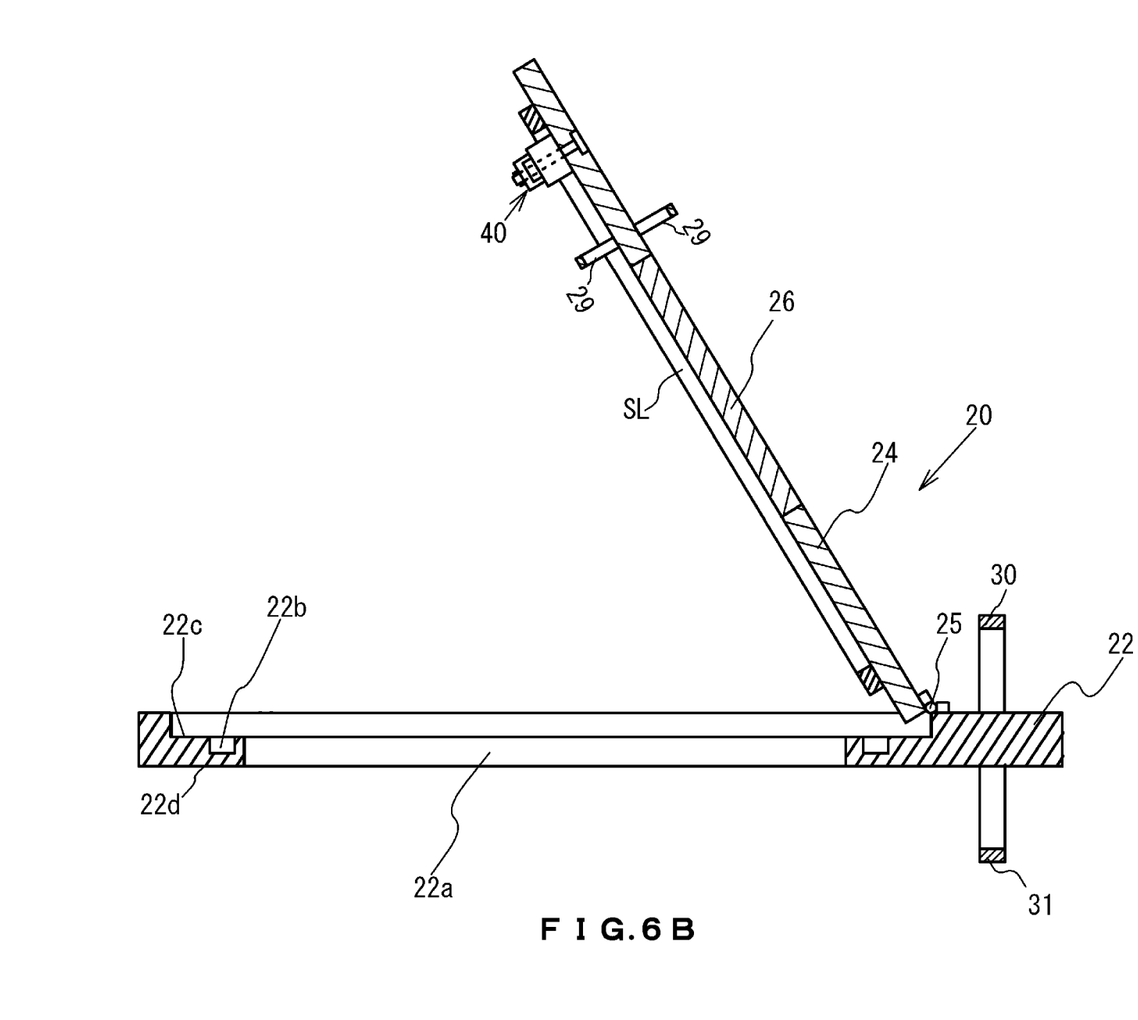
FIG. 6B is a cross-sectional view showing a state in which the door of the partition plate in FIG. 6A is opened.

FIGS. 6A and 6B show an example of the structure of the partition plate 20.

As shown in FIGS. 6A and 6B, a recess 22*c* is formed on the upper surface side of the fixing portion 22 of the partition plate 20, and a groove 22*b* surrounding the periphery of the entrance 22*a* is formed on the bottom surface of the recess 22*c*.

A seal member SL is provided on the lower surface of the door 24, and when the door 24 is closed, the seal member SL fits into the groove 22*b* of the fixing portion 22 to form a seal between the door 24 and the entrance 22*a*. As shown in FIG. 6A, the door 24 is adapted to fit into the recess 22*c* when the entrance 22*a* is closed.

The window 26 made of a transparent resin is fitted in the door 24, and light L enters from the outside through the window 26. That is, the light L is incident into the accommodation space SP of the shelter 1, and the evacuees in the accommodation space SP can grasp the external situation through the window 26.

In the present embodiment, the window 26 is provided on the door 24, but instead of providing the window 26, the door 24 can be formed of a transparent material.

Handles 29 for gripping when opening and closing the door 24 are provided on both sides of the door 24.

A towing hook hole 30 is provided on the upper surface of the fixing portion 22 of the partition plate 20. The towing hook hole 30 is used when towing the drifting shelter 1 by ship or when lifting it by helicopter.

A hand grip 31 is provided on the lower surface of the fixing portion 22 of the partition plate 20. The hand grip 31 is provided for the evacuees in the accommodation space SP to grasp.

Incidentally, the installation position and number of the towing hook hole 30 and the hand grip 31 can be appropriately changed.

Figure 6C:
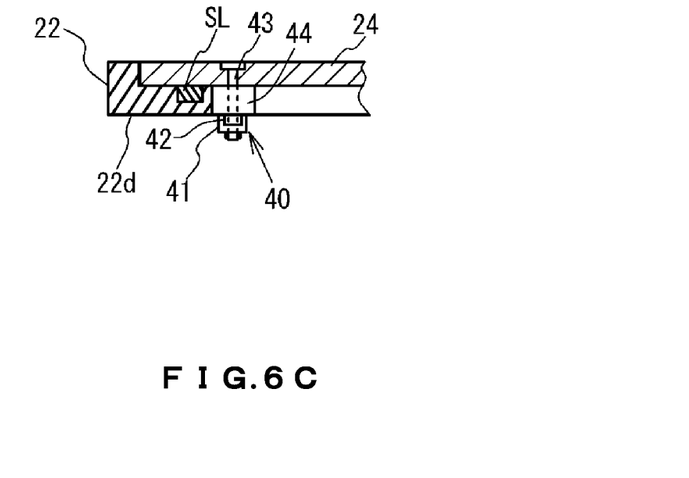
FIG. 6C is a cross-sectional view showing a state in which the locking mechanism provided on the partition plate in FIG. 6A is released.

A locking mechanism 40 is installed on the lower surface of the door 24. The locking mechanism 40 is provided to lock the door 24 so as not to open the door 24 which closes the entrance 22a. The locking mechanism 40 includes an operation lever 41 which is supported on the support member 44 pivotally about a shaft 44 provided on the door 24, and a locking member 42 provided on tip end portion of the operation lever 41. In the state shown in FIG. 6A, the locking mechanism 40 is in a state in which the locking member 42 is engaged with the lower end surface 22d of the fixing portion 22, and the door 24 is in a locked state. The lock is released by turning the operation lever 41 to release the engagement of the locking member 42 with the lower end surface 22d of the fixing portion 22 as shown in 6C. In this state, the door 24 can be opened as shown in FIG. 6B.

Incidentally, in order to prevent wear of the lower surface 22d of the door 24, a thin metal plate made of stainless steel or the like can be provided at a portion of the lower surface 22d of the door 24 where the locking member 42 of the locking mechanism 40 comes into contact.

The locking mechanism 40 is provided on both the upper and lower doors 24, 24, and the evacuee EH may unintentionally hits the operation lever 41 of the locking mechanism 40 located on the lower side to release the lock state of the locking mechanism 40 to cause unintentional opening of the door 2. To prevent this, a safety mechanism such as a stopper made of a protrusion or the like can be provided on the door 24 so that the locking member 42 does not move until a certain large force acts on the operation lever 41.

Figure 7A:
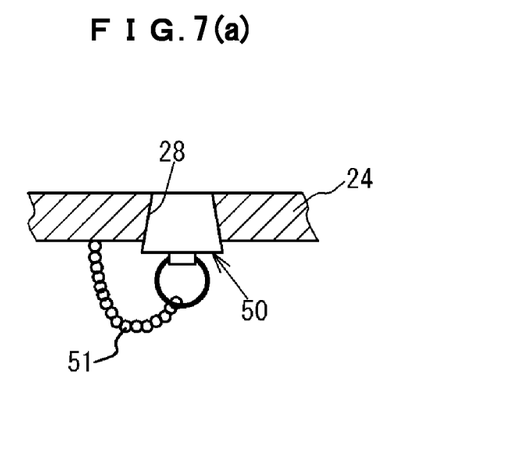
Figure 7B:
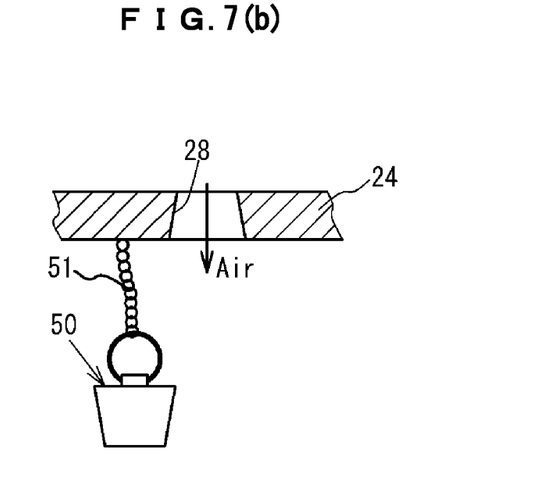

FIG. 7 shows an air hole 28 formed in the door 24 and a blocking plug 50 for closing the air hole 28. The blocking plug 50 is connected to the lower surface of the door 24 by a chain 51. The air hole 28 is a hole formed in a tapered shape, and as shown in FIG. 7 (a), by inserting the blocking plug 50 formed in a tapered shape into the air hole 28, it is possible to reliably prevent the intrusion of water. When it is necessary to take air into the accommodation space SP of the shelter 1, the blocking plug 50 is manually pulled out from the air hole 28 of the door 24 on the non-submerged side, and as shown in FIG. 7 (b), air can be taken in through the air hole 28.

In the present embodiment, the air hole 28 is provided in the door 24, but the construction is not limited thereto, and it is also possible to provide the air holes 28 in the respective fixing portions 22 of the two partition plates 20.

Figure 8A:
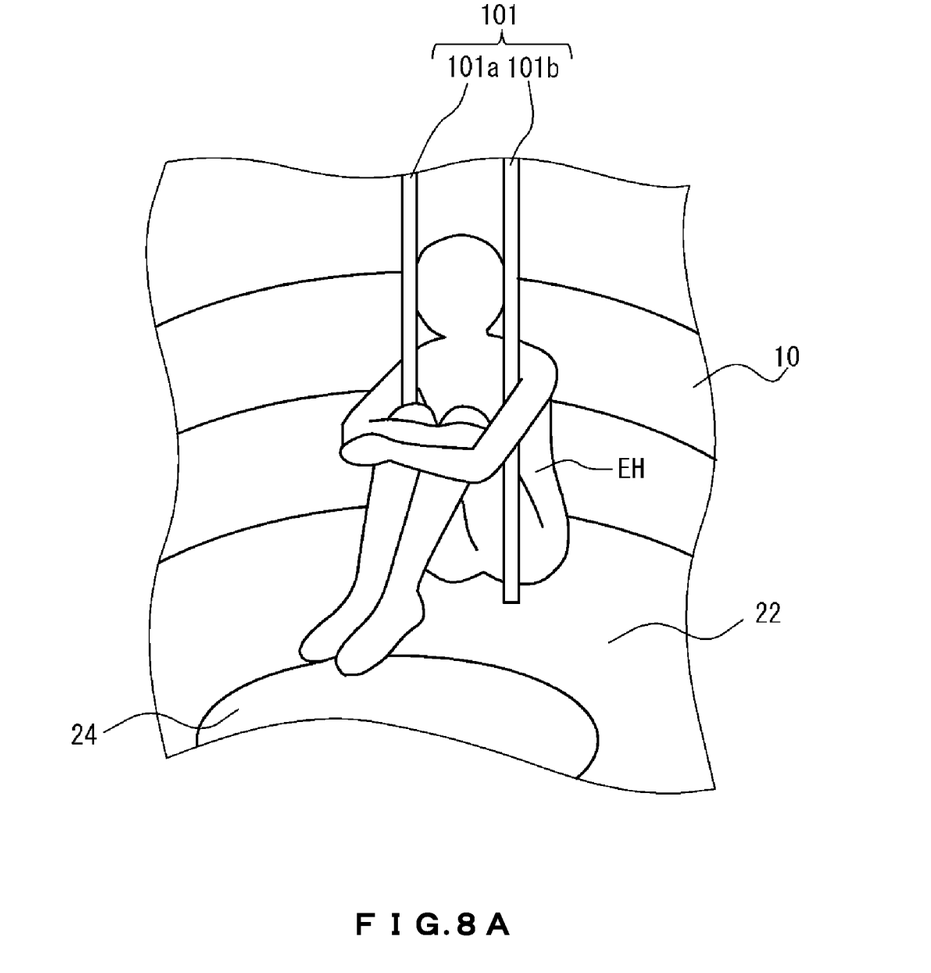
FIG. 8A is a diagram showing the structure of a safety belt provided in a simple shelter for flood evacuation to prevent falling.

FIG. 8A shows a safety belt 101 provided to enhance the safety of evacuees EH evacuated in the accommodation space SP of the shelter 1.

The safety belt 101 is composed of two belts 101a and 101b having flexibility, the two belts 101a and 101b extend between the upper and lower two partition plates 20, and they are arranged in parallel and apart from each other. One end of each of the belts 101a and 101b is fixed to the fixing portion 22 of the partition plate 20 on the upper side, and the other end of each of the belts 101a and 101b is fixed to the fixing portion 22 of the partition plate 20 on the lower side.

As shown in FIG. 8A, the evacuee EH places his/her body between the inner peripheral surface of the floating body 10 and the two belts 101a and 101b, and holds the two belts 101a and 101b from the outside, or grasps the two belts 101a and 101b with both hands, thereby avoiding the evacuee EH from falling in the accommodation space SP due to the shaking of the shelter 1. The evacuee EH does not need any special operation, and does not need any operation for releasing the safety belt 101 when escaping from the shelter.

Figure 8B:
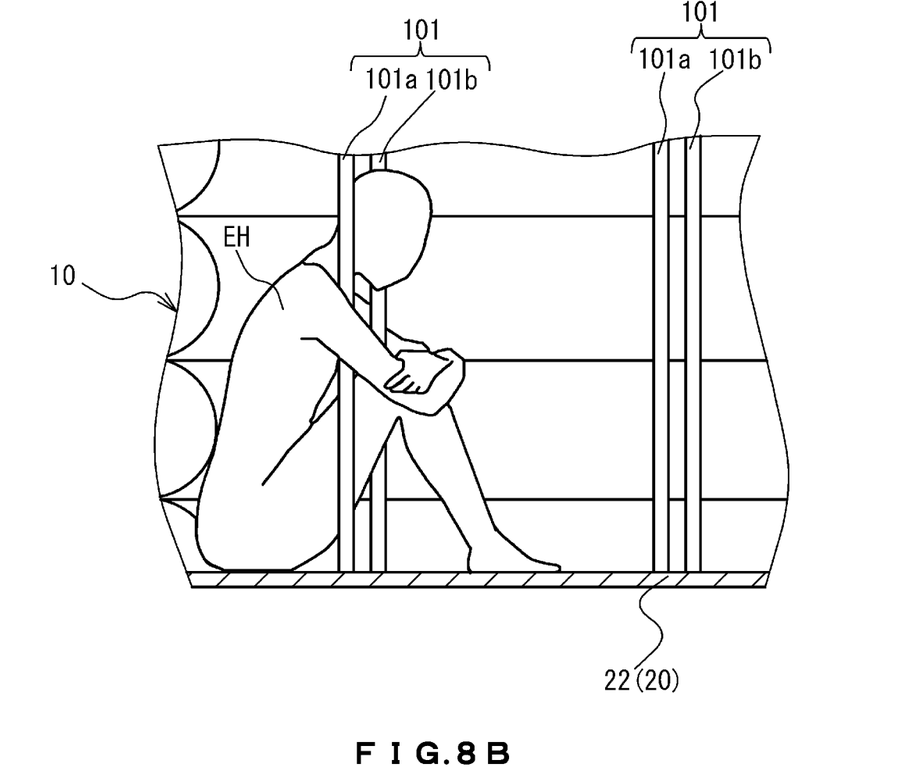
FIG. 8B is a diagram in which a plurality of safety belts is provided in an accommodation space of a shelter.

The safety belt 101, as shown in FIG. 8B, is preferably provided at a plurality of places (two places). As a result, the evacuee EH can select the safety belt 101 in an easy-to-use position according to the situation.

Figure 9:
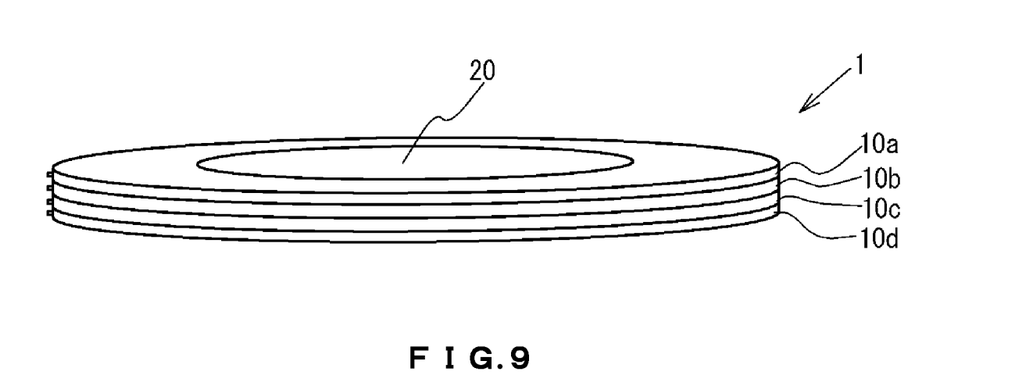
FIG. 9 is a perspective view schematically showing the external form in the storage state of the simple shelter for flood evacuation.

FIG. 9 schematically shows the outer shape of the shelter 1 in the storage state. As shown in FIG. 9, when each of the floats 10a to 10d is not filled with gas, each of the floats 10a to 10d is stacked in a flat state, and the shelter 1 has a substantially disk-like shape. Since the shelter 1 is not provided with a heavy object such as a high-pressure cylinder, it is extremely light and compact in a storage state. Therefore, it is unnecessary to occupy a large storage space, and transportation is easy.

When storing the shelter 1, it is preferred to store it together with a device that fills the gas into each float 10a to 10d, such as a foot pump, a hand pump, a conduction pump, or an air compressor.

When a tsunami or flood is detected, the evacuee transports the shelter 1 from the storage location to an appropriate location, where each of the floats 10a to 10d is filled with gas using the pump, air compressor, or the like described above, and the floats 10a to 10d are inflated.

The evacuee opens one of the two doors 24 and enters into the accommodation space SP. Since the shelter 1 is provided with doors 24 on each of the upper and lower partition plates 20, 20, even when one of the partition plates 20 is submerged, it is possible to grasp the external situation through the door 24 provided on the other partition plate 20, and it is also possible to escape from the shelter 1 by opening one of the two doors 24 depending on the situation.

The shelter 1 is provided with a gas injection valve 11 in each of the plurality of floats 10a to 10d, and since the gas inside is independent, even if any of the floats is broken and gas is released, the floating body 10 can be floated on the water surface by the remaining float, so that the entire shelter 1 can be prevented from being submerged.

While embodiments of the present invention have been described in detail above, the present invention is not limited to such particular embodiments, and various modifications and changes are possible within the scope of the gist of the present invention as described in claims.

REFERENCE SIGNS LIST

1 Simple shelter for flood evacuation
10 Floating body
10a to 10d Float
11 Gas injection valve
20 Partition plate
22 Fixing portion
22a Entrance
22b Groove
22c Recess
SL Seal member
24 Door
25 Hinge 26 Window
28 Air hole
29 Handle
30 Towing hook hole
31 Hand grip
40 Locking mechanism
50 Blocking plug
51 Chain
101 Safety belt
10a, 101b Belt

What is claimed is:

1. A simple shelter for flood evacuation comprising:
a floating body being substantially cylindrical and formed by a plurality of floats each filled with a gas injected through a gas injection valve and having a hollow doughnut shape, the plurality of floats being stacked in a vertical direction and vertically adjacent floats of the plurality of floats being connected to each other; and
two partition plates provided on inner circumferential sides of uppermost and lowermost floats, respectively, of the plurality of floats;
an inner peripheral surface of the floating body and the two partition plates forming an accommodation space being closed for accommodating an evacuee by preventing water from entering from an outside, and
the two partition plates each provided with a door for the evacuee to enter and exit the accommodation space.

2. The simple shelter for flood evacuation according to claim 1, further comprising a safety belt consisting of two belts extending between the two partition plates and arranged in parallel and apart from each other, the safety belt configured to arrange a body of the evacuee between the inner peripheral surface of the floating body and the two belts to prevent the evacuee from falling.

3. The simple shelter for flood evacuation according to claim 1, wherein the two partition plates are each provided with an air hole for taking air from the outside into the accommodation space,
and the simple shelter further comprising blocking plugs manually insertable into and removable from the air holes.

4. The simple shelter for flood evacuation according to claim 1, wherein the doors of the two partition plates are each provided with a window made of a transparent material through which visual recognition of an outside is possible.

* * * * *